US006376760B1

(12) United States Patent
Tozuka et al.

(10) Patent No.: US 6,376,760 B1
(45) Date of Patent: Apr. 23, 2002

(54) PARAMETER SETTING TECHNIQUE FOR USE IN MUSIC PERFORMANCE APPARATUS

(75) Inventors: Akira Tozuka; Yasuhiko Asahi, both of Hamamatsu (JP)

(73) Assignee: Yamaha Corprration (JP)

( * ) Notice: Subject to any disclaimer, the term of this patent is extended or adjusted under 35 U.S.C. 154(b) by 0 days.

(21) Appl. No.: 09/474,727

(22) Filed: Dec. 29, 1999

(30) Foreign Application Priority Data

Jan. 18, 1999 (JP) .......................................... 11-009317

(51) Int. Cl.[7] ............................. G01H 1/40; G01H 7/00

(52) U.S. Cl. ............................. 84/635; 84/622; 84/626; 84/634; 84/610; 84/611

(58) Field of Search ................... 84/600–613, 622–627, 84/634–637, 649–652, 659–660, 662–663, 666, 669

(56) References Cited

U.S. PATENT DOCUMENTS 5,739,453 A * 4/1998 Chihana et al. ............... 84/615
5,920,025 A * 7/1999 Itoh et al. ...................... 84/611
6,031,175 A * 2/2000 Tozuka ........................ 84/610

* cited by examiner

*Primary Examiner*—Marlon T. Fletcher
(74) *Attorney, Agent, or Firm*—Morrison & Foerster LLP

(57) ABSTRACT

In response to user's selection of a desired instrument style such as a piano style, only some of memory-stored automatic performance data sets that belong to the selected instrument style are made selectable. On the other hand, a tonal characteristic for manual performance is set to a tonal characteristic corresponding to the selected instrument switch. Thus, in executing an ensemble of manual and automatic performances, even a beginner can readily select and set a tone color and performance pattern. According to another aspect, there is provided a memory storing a plurality of automatic performance data sets and the setting parameters in corresponding relation to a plurality of performance styles. Tone setting parameters include manual performance tone setting parameters that are suited at least for the plurality of performance styles. Thus, once a performance style is selected for a desired automatic performance, not only the automatic performance data set but also the manual performance tone setting parameters suited for the performance style can be automatically selectively read out from the memory, and a tone based on a manual performance via a keyboard or the like is set in accordance with the manual performance tone setting parameters.

17 Claims, 7 Drawing Sheets

PARAMETER SETTING TECHNIQUE FOR USE IN MUSIC PERFORMANCE APPARATUS

BACKGROUND OF THE INVENTION

The present invention relates generally to a parameter setting technique for use in music performance apparatus, such as electronic musical instruments, which can carry out a wide variety of music performances by variably setting various parameters, and more particularly a technique which is capable of setting, via a very simple setting operation, parameters suited for any given performance style selected.

Electronic musical instrument known today are capable of synthesizing a wide variety of tones that cannot be expressed by natural musical instruments, not to mention human voices. In these electronic musical instruments, there is a need to set various parameters in order to generate desired tones. The simplest form of conventionally-known electronic musical instrument, such as a piano, electric piano or organ, is provided with tone color setting keys so that the color (timbre) of each tone to be generated by the musical instrument can be varied to a desired one by activating a selected one of the tone-color setting keys. It has also been known to preset settings of a plurality of draw-bar and feet operators so as to selectively realize a desired tone color. However, along with the progressive advance in the electronic musical instrument technology, an increasing number of electronic musical instruments have been constructed to provide, in addition to the tone color selection, various effect sounds and additional performances, such as accompaniment and percussion performances, in response to a performance operation by a human player or user. However, each time any one of such additional performances is to be executed, it is necessary for the player or user to manually set performance parameters, pertaining to the additional performance, one by one. Further, whereas it had been conventional to include tone color data in the header portion or the like of automatic performance data, the tone color data is applied solely to the automatic performance data in question.

For example, in a situation where settings are to be made in an electronic musical instrument such that the electronic musical instrument is used for a piano performance, a chord part (i.e., left-hand accompaniment part) is performed via an automatic performance apparatus and a melody part (i.e., right-hand performance part) is performed by a user's manual operation on a keyboard, the following setting operation has to be made. First, one of multiple different sets of automatic performance data (i.e., data corresponding to the left-hand performance part) which is to be performed has to be selected by means of an automatic-performance-data selecting switch or the like. Then, a predetermined switch has to be operated to set a synchronization start such that the selected set of automatic performance data starts being performed in synchronism with a start of the manual performance on the keyboard. After that, a tone color to be sounded by the keyboard performance is selectively set via a manual tone-color selecting switch in accordance with tone colors set for the individual performance parts of the selected automatic performance data set. In the past, the necessary settings has to be made in the electronic musical instruments through such a series of cumbersome operation. In normal cases, each set of automatic performance data comprises a plurality of performance parts (or a plurality of tracks), so that when only a predetermined one of the performance parts is to be automatically performed, there would arise another need to make additional settings, by use of a display panel or the like, to mute or silence every other performance part that is not to be automatically performed.

Further, because there has been a tendency for the present-day electronic musical instruments to be equipped with highly sophisticated functions to provide so-called "high-performance electronic musical instruments", an increasing number of varieties of performance parameter have to be set and the user himself (herself) must be throughly familiar with suitable performance parameters and a suitable way of setting these performance parameters in order to generate tones appropriately as desired. Even in cases where the user is already familiar with the suitable performance parameters and the suitable way of setting these performance parameters and when setting are to be made for the entire electronic musical instrument corresponding to or approximating a user-desired natural musical instrument, it would be necessary for the user to take the trouble to make the necessary settings one by one and the cumbersomeness of the setting operation would be the same as normally encountered by the less sophisticated prior techniques. Particularly, such a difficult and cumbersome setting operation is a significant problem for beginners who have never experienced the performance-parameter setting operation, and thus these beginners would feel quite a difficulty in setting the electronic musical instrument for the first time and would often be given a negative impression that high-performance electronic musical instruments are very difficult to handle.

SUMMARY OF THE INVENTION

In view of the foregoing, it is an object of the present invention to provide a music performance apparatus which is capable of making various settings for manual and automatic performances suited for a variety of instrument styles.

It is another object of the present invention to provide a music performance apparatus which allows even a beginner to readily set, through a very simple operation, performance parameters suited for various performance styles in a high-performance electronic musical instrument, or a setting apparatus and method for use in such a music performance apparatus.

In order to accomplish the above-mentioned objects, the present invention provides a music performance apparatus which comprises: a manual performance operator; an instrument style selector that is used to select a desired instrument style; a memory that stores a plurality of performance data sets; a performance style selector that is used to select a desired one of the performance data sets; and a processor coupled at least with the instrument style selector, the memory and the performance style selector. The processor is adapted to: make selectable, via the performance style selector, some of the performance data sets which correspond to the instrument style selected via the instrument style selector; read out, from the memory, one of the performance data sets made selectable by the processor which has been selected via the performance style selector; execute an automatic performance on the basis of the performance data set read out from the memory; and control a tone based on a manual performance executed via the manual performance operator, with a tonal characteristic corresponding to the instrument style selected via the instrument style selector.

According to the present invention arranged in the above-mentioned manner, in response to user's selection of a desired instrument style such as a piano style, the processor makes selectable only some of the memory-stored performance data sets which belong to the selected instrument style. Then, a desired one of the performance data sets, having been thus made selectable by the processor, is selected and read out from the memory to execute an automatic performance. On the other hand, a tonal characteristic for a manual performance is set to the one corresponding to the selected instrument style. In this way, selection of the automatic performance suited for the desired instrument style and setting of the tonal characteristic for the manual performance can be made with utmost ease. As a consequence, in executing an ensemble of manual and automatic performances, even a beginner can readily select and set various necessary musical factors, such as a tone color and performance pattern, in an appropriate manner.

The manual performance operator in the present invention may comprise a keyboard including a plurality of keys, and the performance style selector may share predetermined ones of the keys of the keyboard with the manual performance. These predetermined keys are allowed to function as the above-mentioned performance style selector, in response to selection of the instrument style via the instrument style selector. Further, the memory may have prestored therein a plurality of automatic performance data sets and tone setting parameters of a plurality of performance styles, in corresponding relation to a plurality of the instrument styles. Desired one of the performance styles that belong to the instrument style selected via the instrument style selector is made selectable via the performance style selector. The processor is adapted for reading out the automatic performance data set and tone setting parameters from the memory in accordance with the performance style selected via the performance style selector and controlling, in accordance with the tone setting parameters read out from the memory, the tone based on the manual performance executed via the manual performance operator, with the result that the tone based on the manual performance is controlled with the tonal characteristic corresponding to the instrument style selected via the instrument style selector.

Further, the music performance apparatus may further comprise a selector that selects a demonstration performance, and in response to selection of the demonstration performance via the selector, the processor may read out, from the memory, the automatic performance data set corresponding to the performance style selected via the performance style selector and execute an automatic performance corresponding to the selected performance style on the basis of the read-out automatic performance data set. In this way, details of the tone setting parameters, such as a tone color, which are automatically selected and set in accordance with the performance style can be confirmed through the demonstration performance. On the basis of the confirmation through the demonstration performance, the user can appropriately change the details of the automatically-set tone color and other tone setting parameters, through a manual operation, in case the details are not satisfactory.

According to another aspect of the present invention, there is provided a music performance apparatus which comprises: a manual performance operator; a selecting device that selects a desired performance style from among a plurality of performance styles; a memory that stores data including tone setting parameters and automatic performance data sets in corresponding relation to the plurality of performance styles, the tone setting parameters including manual performance tone setting parameters that are suited at least for the plurality of performance styles; and a processor coupled at least with the selecting device and the memory, the processor adapted to read out, from the memory, the tone setting parameters corresponding to the performance style selected via the selecting device and control, in accordance with the manual performance tone setting parameters read out from the memory, a tone based on a manual performance executed via the manual performance operator.

The tone setting parameters stored in the memory in corresponding relation to the plurality of performance styles include manual performance tone setting parameters that are suited at least for the plurality of performance styles. Thus, once a performance style is selected for a desired automatic performance, not only the automatic performance data set but also the manual performance tone setting parameters suited for the selected performance style can be automatically selected and read out from the memory, and a controlling characteristic of a tone based on a manual performance executed via the performance operator (e.g., keyboard) is set in accordance with the read-out manual performance tone setting parameters. Therefore, when the user selects a desired performance style for an automatic performance, the user does not have to make a separate parameter setting operation for the manual performance that is to be executed along with the automatic performance. Namely, the manual performance tone setting parameters suited for the selected performance style are read out from the memory and then set for execution of the manual performance. This inventive arrangement greatly facilitates the parameter setting operation in the electronic musical instrument. Among the tone setting parameters defined by the performance style are, for example, an automatic performance tempo, a keyboard region split position for properly using melody and accompaniment parts on the keyboard and a tone color of each performance part. Examples of the manual performance tone setting parameters include a tone color of the melody part. In this case, the tone color data is possessed by the music performance apparatus although the automatic performance data for the melody part may not be possessed by the music performance apparatus, so that a tone color of each tone manually performed on the keyboard can be set automatically on the basis of the tone color data of the melody part. As another example, when a mode to manually perform the melody part is selected, the automatic performance data for the melody part may be muted, i.e., prevented from being sounded, even in the case where the automatic performance data for the melody part are possessed by the music performance apparatus, so that the manual performance on the keyboard becomes a melody performance. In this case, the performance of the accompaniment part is executed automatically on the basis of the automatic performance data.

According to still another aspect of the present invention, there is provided a setting apparatus for use in an electronic music performance apparatus, which comprises: a manual setting device that sets parameters for controlling a tone to be generated via the electronic music performance apparatus; a selecting device that selects a desired instrument style from among a plurality of instrument styles; a memory that stores at least tone setting parameters in corresponding relation to the plurality of instrument styles, the tone setting parameters including tone setting parameters corresponding to the parameters capable of being set via the manual setting device; and a processor coupled at least with the manual setting device, the selecting device and the memory, the processor adapted to read out, from the memory, the tone setting parameters corresponding to the instrument style selected via the selecting device and change, in accordance with the read-out tone setting parameters, contents of the parameters set via the manual setting device in such a manner that parameter settings in the whole of the electronic music performance apparatus are adjusted to contents corresponding to the selected instrument style. According to this invention, only selecting a desired instrument style can automatically set the parameters in the entire electronic music performance apparatus (e.g., electronic keyboard instrument) to those corresponding to the selected instrument style. Thus, there is no need to set the individual parameters, and the necessary parameter setting operation can be greatly facilitated. Further, even a beginner can readily set parameters for the entire electronic musical instrument which correspond to a desired instrument style.

The present invention may be constructed and implemented not only as the above-mentioned apparatus invention but also as a method invention. The method may be arranged and implemented as a program for execution by a computer, microprocessor or the like, as well as a machine-readable storage medium storing such a program. Further, the hardware implementing the present invention may comprise a combination of logic circuitry and gate array or a fixed hardware device including an integrated circuit, without being necessarily limited to a programmable facility such as a computer or microprocessor. Stated differently, the processor in the inventive apparatus may be a non-programmable processor or control unit only having a fixed processing function, not to mention a programmable processor such as a computer or microprocessor. Further, the electronic musical instrument embodying the present invention may be of any other type than the keyboard type. Furthermore, the music performance apparatus of the present invention may be a personal computer so programmed as to be capable of music performance, rather than being constructed as an electronic musical instrument. Moreover, the music performance apparatus of the present invention may be a karaoke apparatus, game apparatus, cellular phone or any other type of multimedia equipment. Further, it should be noted that the terms "manual performance" as used in the context of the present invention refer not only to a form of performance executed by operating keys with a human player's hand but also to other forms of performance executed using a player's foot or other part of his or her body.

BRIEF DESCRIPTION OF THE DRAWINGS

For better understanding of the object and other features of the present invention, its preferred embodiments will be described in greater detail hereinbelow with reference to the accompanying drawings, in which:

FIG. 3A shows music piece data pertaining to a single-track chord (left-hand) performance part, while FIG. 3B shows music piece data pertaining to a plural-track performance part;

DETAILED DESCRIPTION OF THE PREFERRED EMBODIMENTS

Figure 2:
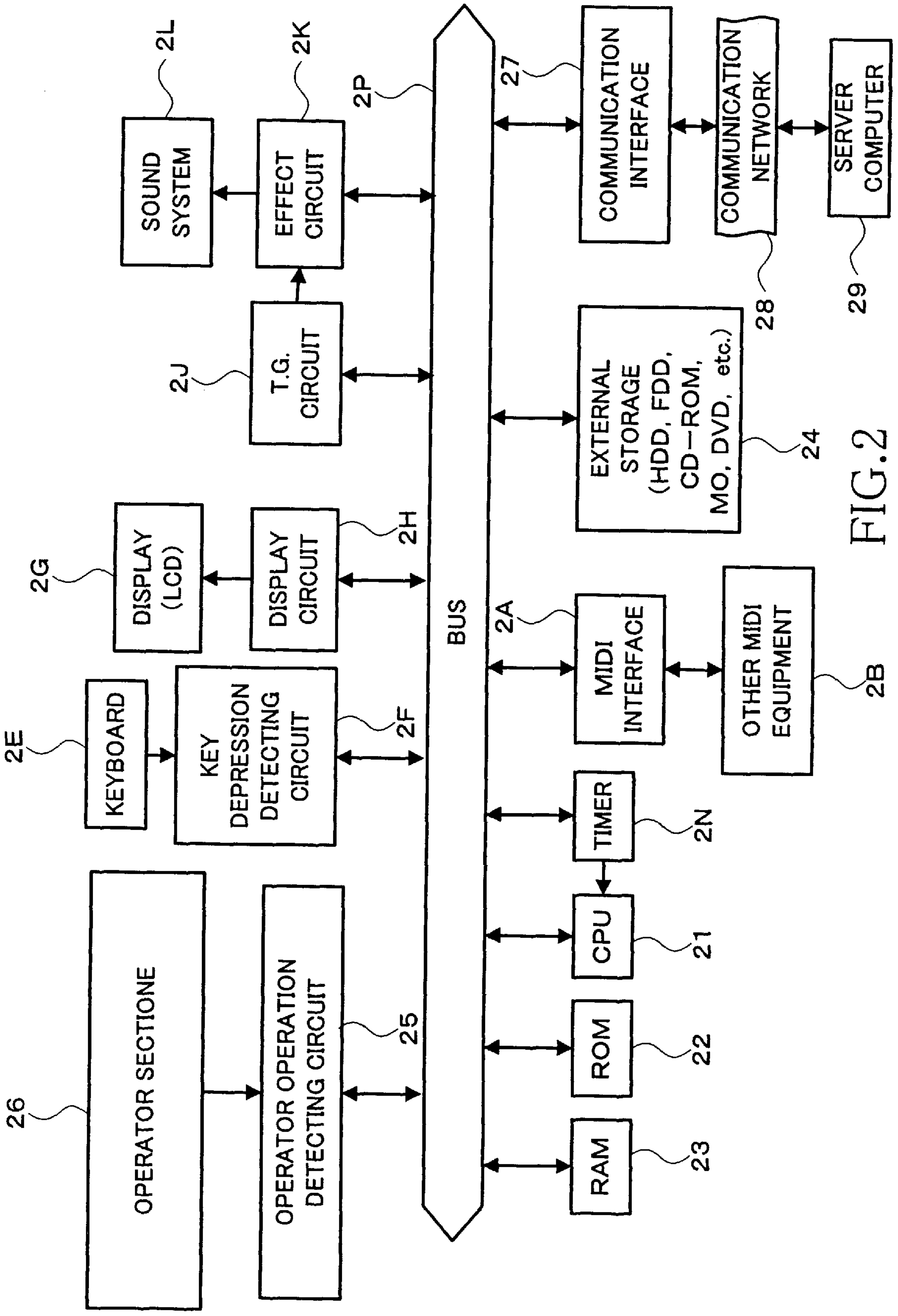
FIG. 2 is a block diagram illustrating a general hardware setup of the electronic musical instrument of the present invention.

FIG. 2 is a block diagram illustrating a general hardware setup of an electronic musical instrument in accordance with a preferred embodiment of the present invention which operates based on a setting control device. The operation of the electronic musical instrument is controlled by a CPU 21. To the CPU 21 are connected, via a data and address bus 2P, a program memory (ROM) 22, a working memory (RAM) 23, an external storage device 24, an operator operation detecting circuit 25, a communication interface 27, a MIDI interface 2A, a key depression detecting circuit 2F, a display circuit 2H, a tone generator (T.G.) circuit 2J and an effect circuit 2K. For convenience, the following description will be made in relation to a case where only minimum necessary resources are used.

The CPU 21 performs various processing based on various programs and data stored in the program memory 22 and working memory 23 and music piece information given from the external storage device 24. In the illustrated example, the external storage device 24 may comprises one or more of a floppy disk drive, hard disk drive, CD-ROM drive, magneto optical (MO) disk drive, ZIP drive, PD drive, DVD (Digital Versatile Disk) drive, etc. Music piece information may be received from other MIDI equipment 2B or the like via the MIDI interface 2A. The CPU 21 supplies the tone generator circuit 2J with the music piece information thus given from the external storage device 24, so that each tone generated by the tone generator circuit 2J on the basis of the music piece information is audibly reproduced or sounded via an external sound system 2L.

The program memory 22, which is a read-only memory (ROM), has prestored therein various programs (including system and operating programs) for execution by the CPU 21, as well as various parameters and data. In the illustrated example, piano style data, key allocation table, style data, automatic performance data, etc. are prestored in the program memory 22. The working memory 23, which is provided for temporarily storing various data generated as the CPU 21 executes the programs, is allocated in predetermined address regions of a random access memory (RAM) and used as registers, flags, etc. Instead of the operating program, various data and the like being prestored in the program memory 22, they may be prestored in the external storage device 24 such as the CD-ROM drive. The operating program and various data prestored in the external storage device 24 can be transferred to the RAM 23 or the like for storage therein so that the CPU 21 can operate in exactly the same way as in the case where the operating program and data are prestored in the internal program memory 22. This arrangement greatly facilitates version-upgrade of the operating program, addition of a new operating program, etc.

Further, the electronic musical instrument may be connected via the communication interface 27 to various communication networks such as a LAN (Local Area Network), the Internet and telephone line network to exchange data (music piece information accompanied by relevant data) with a desired sever computer 29. Thus, the operating program and various data can be downloaded from the server computer 29. In such a case, the electronic musical instrument, which is a "client", sends a command to request the server computer 29 to download the operating program and various data by way of the communication interface 27 and communication network 28. In response to the command from the electronic musical instrument, the server computer 29 delivers the requested operating program and data to the electronic musical instrument and/or other personal computer via the communication network 28. The electronic musical instrument and/or other personal computer receive the operating program and data via the communication interface 27 and store them into the RAM 23 or the like. In this way, the necessary downloading of the operating program and various data is completed.

Note that the present invention may be implemented by a personal computer where are installed the operating program and various data corresponding to the operation of the present invention. In such a case, the operating program and various data corresponding to the present invention may be supplied to users in the form of a storage medium, such as a CD-ROM and floppy disk, that is readable by the electronic musical instrument.

Operator section 26 includes various operators, such as keys and switches and/or selectors, for setting various parameters. For convenience, the preferred embodiment of the present invention will be described in relation to a specific case where the operator section 26 includes a piano style switch (abbreviated "SW"), automatic-performance-related switches, a tone color setting switch, a tempo setting switch, a demonstration setting switch, etc., although any other suitable operators may of course be provided on the operator section 26. The operator operation detecting circuit 25 constantly detects respective operational states of the individual operators on the operator section 26 and outputs operator operation information, corresponding to the detected operational states, to the CPU 21 via the data and address bus 2P. The operator section 26 may include, in addition to or in place of the individual keys and switches, any other types of operators such as a combination of a visual display and a mouse and a numerical keypad. Keyboard 2E includes a plurality of keys for selecting a pitch of each tone to be generated. The embodiment is described here as employing the keyboard keys as note performance operators, any other note performance operators than the keyboard keys may be employed. The key depression detecting circuit 2F includes key switch circuits provided in corresponding relation to the individual keys of the keyboard 2E. Whenever any one of the keys is newly depressed on the keyboard 2E, the key depression detecting circuit 2F outputs key-on event data including a note number indicative of the depressed key, while whenever any one of the keys is newly released on the keyboard 2E, the key depression detecting circuit 2E outputs key-off event data indicative of the released key. Display 2G in the illustrated example comprises an LCD (Liquid Crystal Display) or the like and controlled by the display circuit 2H.

The tone generator circuit 2J, which is capable of simultaneously generating tone signals in a plurality of channels, receives music piece information (MIDI file) supplied via the data and address bus 2P and MIDI interface 2A and generates tone signals based on these received information. The tone generation channels to simultaneously generate a plurality of tone signals in the tone generator circuit 2J may be implemented by using a single circuit on a time-divisional basis or by providing a separate circuit for each of the channels. Further, any tone signal generation scheme may be used in the tone generator circuit 2J depending on an application intended. Each of the tone signals output from the tone generator circuit 2J is audibly reproduced through the sound system 2L comprised of an amplifier and speaker. Also note that there is further provided, between the tone generator circuit 2J and the sound system 2L, the effect circuit 2K for imparting various effects to the tone signals generated by the tone generator circuit 2J. In an alternative, the tone generator circuit 2J may itself contain such an effect circuit 2K. Timer 2N generates tempo clock pulses to be used for measuring a designated time interval or setting a reproduction tempo of the music piece information. The frequency of the tempo clock pulses is adjustable via a tempo switch (not shown). The tempo clock pulse from the timer N is given to the CPU 21 as an interrupt instruction, so that the CPU 21 interruptively carries out various operations for an automatic performance.

The following paragraphs describe a first example of behavior of the setting control apparatus in the electronic musical instrument of FIG. 2, with reference to FIGS. 1 and 3–5. According to the first example of behavior, once a predetermined key on the keyboard 2E is depressed while the piano style switch is turned on, the piano style data corresponding to the depressed key are selected and the selected piano style data are placed in a readout standby state in response to a deactivation or turning-off operation of the piano style switch. Then, when a human player or user starts performing on the keyboard 2E after the setting of the readout standby state, a tone generation process to sound the piano style data in the readout standby state is initiated in synchronism with the start of the user's keyboard performance. In the tone generation process, the tone generation is carried out at a tempo based on tempo data contained in the selected piano style data, and the keyboard performance and an automatic performance responsive to selected piano style are processed with a tone color based on tone color data contained in the selected piano style data.

Figure 1:
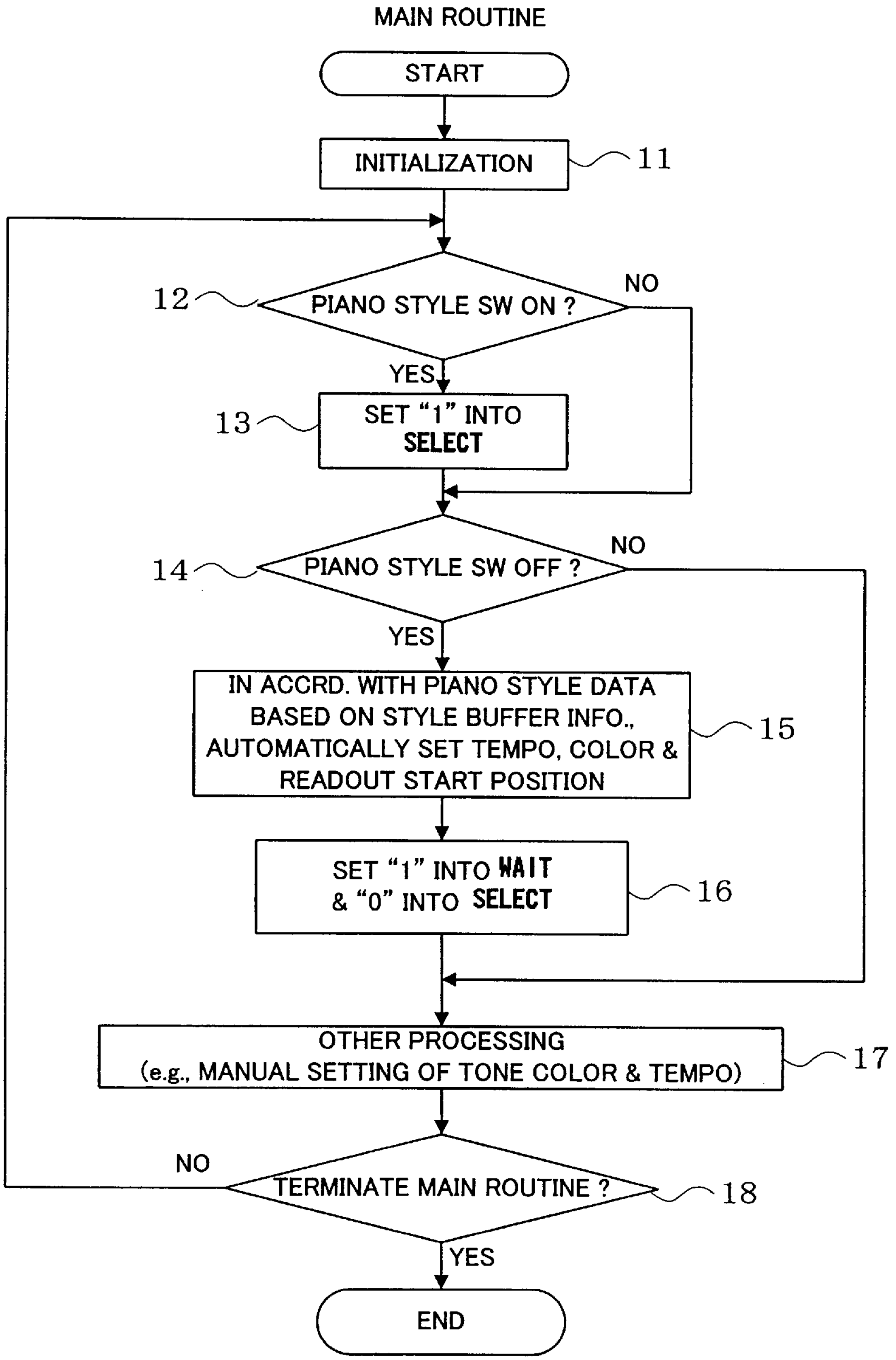
FIG. 1 is a flow chart of a main routine according to a first example of behavior of a setting control apparatus employed in an electronic musical instrument of the present invention.

FIG. 1 is a flow chart of a main routine carried out in the electronic musical instrument. The CPU 21 of FIG. 1 operates in accordance with this main routine, which starts and ends in response to turning-on and turning-off, respectively, of a main power source. The main routine proceeds in the following step sequence. At first step 11, an initialization process is performed in order to set predetermined initial values into the registers, flags etc. within the working memory 23 of FIG. 2. More specifically, a value "0" is set into each of a selection flag SELECT, wait flag WAIT and run flag RUN, and a value "1" is set into a style buffer STYLE. Details of these flags and buffer will be later described in connection with corresponding operations.

After the initialization process of step 11, the main routine goes to step 12 to determine whether or not the piano style switch has been turned on or operated on the operator section 26 and then to step 14 to determine whether or not the piano style switch has been turned off, to carry out operations corresponding to results of the determinations of steps 12 and 14. Specifically, if the piano style switch has been turned on as determined at step 12, the value "1" is set at step 13 into the selection flag SELECT. If the piano style switch has been turned off as determined at step 14, then the main routine proceeds to step 15 in order to set a tempo and tone color in accordance with the piano style data based on information that is currently contained in the style buffer and also set a position where to read out performance data.

Here, the selection flag SELECT is a flag for use in deciding whether the key depression operation should be judged to be a tone generating operation or a piano style data selecting operation, and is employed for a key release process as will be described later. Namely, when the piano style switch is turned on in the preferred embodiment, the value "1" is set at step 13 into the selection flag SELECT to indicate that every key depression operation detected after this step is judged to be an operation for selecting piano style data. When, on the other hand, the piano style switch is turned off in the preferred embodiment, the value "0" is set at step 16 into the selection flag SELECT to indicate that every key depression operation after this step is judged to be a normal performance operation in order to carry out a normal tone generation process. The style buffer STYLE is provided for storing a style number of the currently selected piano style data, and its content is changed in a key depression/release process as will be described later. "Setting a position where to read out performance data" means setting a performance data readout position at leading or first timing data within the currently selected piano style data; thus, the performance data are sequentially read out beginning at the thus-set readout position and the resultant readout data are subjected to the tone generation process.

At step 16, the value "1" is set into the wait flag WAIT, and the value "0" is set into the selection flag SELECT. The wait flag WAIT is provided to indicate whether or not the piano style data are in the readout standby state; namely, the flag WAIT at the value "1" indicates that the piano style data are in the readout standby state and the flag WAIT at the value "0" indicates that the piano style data are not in the readout standby state. The "readout standby state" means that the piano style data selected via a manual operation of the piano style switch currently stands ready to be read out in response to a user's subsequent key depression operation.

Figure 3A:
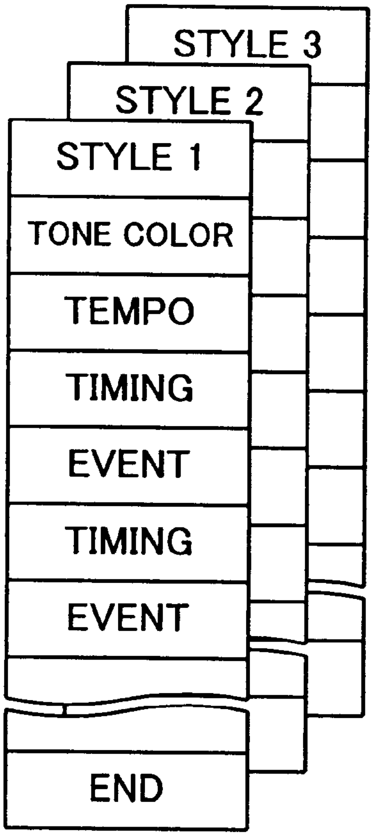
FIGS. 3A and 3B are diagrams showing examples of piano style data; that is.
Figure 3B:
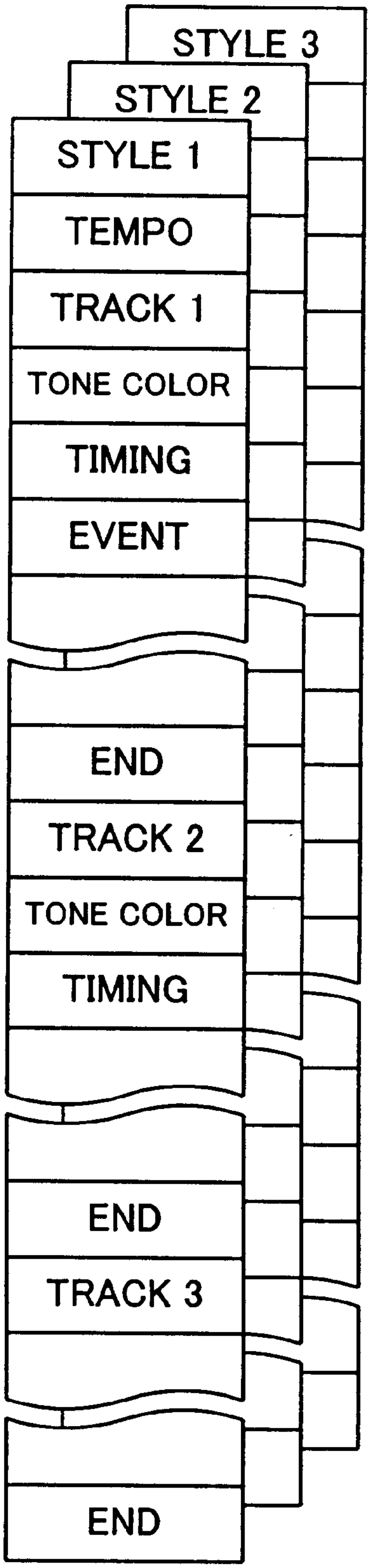

FIGS. 3A and 3B are diagrams showing examples of the piano style data; namely, FIG. 3A shows music piece data pertaining to a single-track chord (left-hand) performance part, while FIG. 3B shows music piece data pertaining to a plural-track right-hand performance part. Each of the piano style data sets comprises performance data consisting of combinations of the style number (style 1–style 3), data pertaining to a tone color and tempo, timing data and event data. In this case, the tone color is intended to set a common tone color to be shared between an automatic performance but also for the entire electronic musical instrument (namely, for a manual performance). In the preferred embodiment of the present invention, a plurality of (three in the illustrated example) sets of the piano style data are prestored in the program memory (ROM) 22. These sets of the piano style data are allocated to or associated with predetermined keys of the keyboard, so that by depressing any one of the predetermined keys while the piano style switch is turned ON, one of the sets of the piano style data which corresponds to the depressed predetermined key is read out and set in the electronic musical instrument. Whereas the illustrated example is described here as employing three sets of the piano style data, a plural sets of style data corresponding to any other desired musical instrument in addition to the piano style data sets, as well as a key allocation table indicative of a correspondency between the piano style data sets and the keys to be depressed for selection of the style data sets, may be prestored in the program memory (ROM) 22 so that an increased number of the style data sets can be selected using the keyboard keys.

Upon completion of the above-described operation responsive to the turning-on or turning off of the piano style switch, the main routine moves on to step 17 in order to carry out other processing, which, in the illustrated example, includes setting a tone color for the entire electronic musical instrument and a tempo in response to manual switch operations, reproducing automatic performance data stored in the program memory (ROM) 22 separately from the piano style data, recording automatic performance data, etc. After completion of the other processing, a determination is made at step 18 as to whether an instruction to terminate the main routine has been given by the user or the like, i.e., whether the main power source has been turned off. If so, the main routine is brought to an end, but if the main power source is still ON, the above-described operations are repeated. In the illustrated example, the manually-set parameter data can be changed in accordance with the style data and the parameters set in accordance with the style data can be changed by a manual operation.

Figure 4:
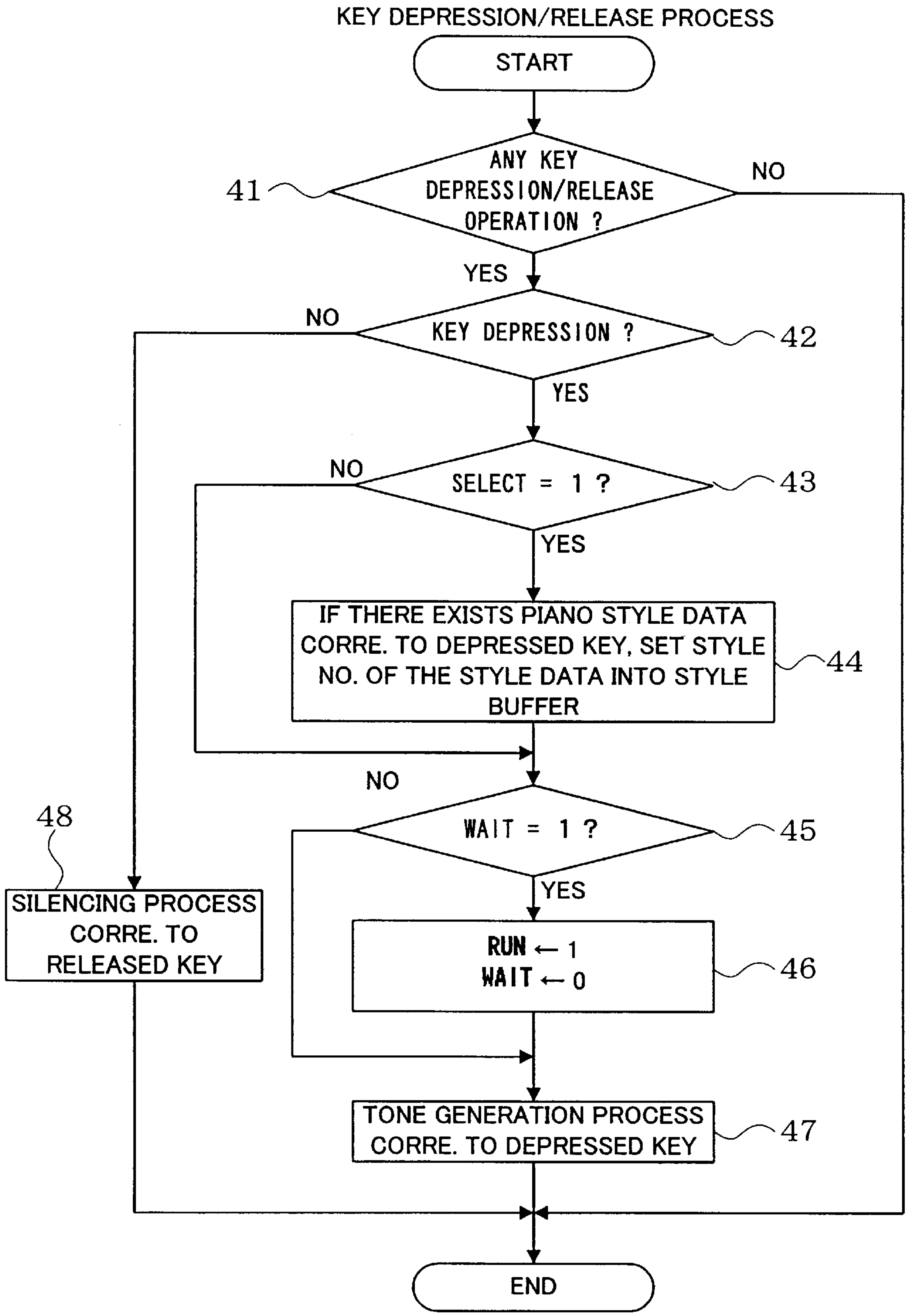
FIG. 4 is a flow chart of a key depression/release process which is interruptively executed every 20 ms during execution of the main routine of FIG. 1.

The key depression/release process of FIG. 4 is interruptively executed every 20 ms during execution of the main routine. In this key depression/release process, it is first determined at step 41 whether or not any key depression/release operation has been made, on the basis of a signal from the key depression detecting circuit 2F. If there has been a key depression/release operation as determined at step 41 (YES), it is further determined at step 42 whether the detected key depression/release operation is a key depression operation. If the detected key depression/release operation is a key release operation as determined at step 42 (NO determination), then the process branches to step 48 in order to carry out a normal tone deadening (silencing) process corresponding to the released key and is then brought to an end. If, however, the detected key depression/release operation is a key depression operation as determined at step 42 (YES determination), then the process goes to step 43, where a further determination is made as to whether the selection flag SELECT is currently at the value "1" or "0". If the selection flag SELECT is currently at the value "1", the current key depression is judged to be an operation for selecting one of the piano style data sets, and thus the process moves on to step 44. At step 44, if there is stored the piano style data set corresponding to the depressed key, the style number of the piano style data set is stored into the style buffer STYLE. At that time, the above-mentioned key allocation table is referred to for the correspondency between the piano style data set and the key. If, however, there is not stored the piano style data set corresponding to the depressed key, no change is made to the style number of the currently-selected piano style data set, i.e., the content of the style buffer STYLE is left unchanged.

Then, at step 45, a determination is made as to whether the wait flag WAIT is currently at the value "1" or "0". If the wait flag WAIT is currently at the value "1", the current key depression is judged to be a very first key depression operation in the readout standby state of the piano style data, so that the values "0" and "1" are set into the wait and run flags WAIT and RUN, respectively. The run flag RUN is a flag indicating whether a later-described style performance process is to be carried out or not; that is, the run flag RUN at the value "1" indicates that the style performance process is to be carried out, while the run flag RUN at the value "0" indicates that the style performance process is not to be carried out. Thus, setting the run flag RUN to "1" will initiate an automatic performance of the selected piano style data. Then, the value "0" is set into the wait flag WAIT since such a first key depression operation will not occur again in the readout standby state of the piano style data.

After completion of the above-described operations, the normal tone generation process is carried out at step 47 in response to the depressed key, after which the key depression/release process is brought to an end. Note that in case no operation to select one of the piano style data sets has been made during the turning-on or turning-off operation of the piano style switch, the setting control apparatus operates to be in the readout standby state based on the last-selected piano style data set. Further, if no operation to select one of the piano style data sets has been made at all before, then the setting control apparatus operates in such a way that the piano style data set of style 1 is selected as an initial setting.

Figure 5:
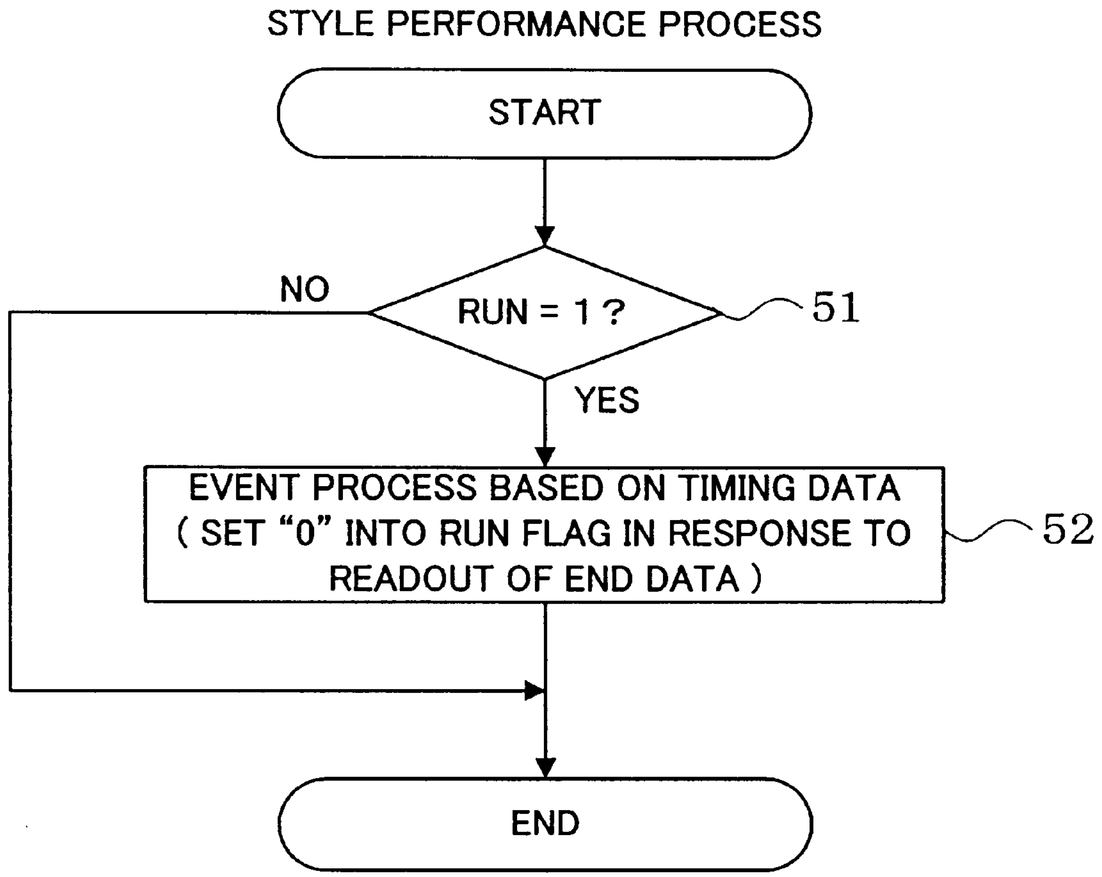
FIG. 5 is a flow chart of a style performance process which is interruptively carried out per time clock pulse.

FIG. 5 is a flow chart of the style performance process which is interruptively carried out per timer clock pulse; in the preferred embodiment, the length of a quarter note is set to correspond to 96 timer clock pulses. In this style performance process, a determination is first made at step 51 as to whether or not the run flag RUN is at the value "1". If the run flag RUN is at the value "1" as determined at step 51, the process moves to step 52, where the timing data and event data are read out from among the piano style data of the style number stored in the style buffer STYLE and a style performance is carried out in accordance with the read-out data. The "style performance" is intended to automatically sound normal MIDI data; more specifically, the style performance in the preferred embodiment reproduce a tone in accordance with the selected piano style data. Such an automatic performance of the MIDI data is conducted in the well-known manner and therefore will not be described in detail here. In case end data is read out from among the piano style data, the run flag RUN is set to the value "0" so as to prevent the style performance process from being carried out.

Through the operations as flow charted in FIGS. 1 and 3–5, various parameters, such as the tone color and tempo for the entire electronic musical instrument, are automatically set on the basis of the piano style data set selected via the user's key depression operation. Thus, the tone color for the automatically-performed chord part (left-hand performance part) and the tone color for the manually-performed melody part can be readily associated with each other. Namely, in a performance via a natural acoustic piano, it is of course desirable that the tone color be the same for both of the left-hand and right-hand performances. The electronic musical instrument according to the preferred embodiment allows such tone color setting to be made promptly. Further, although the conventional electronic musical instruments, unlike the corresponding natural or acoustic musical instruments, would require individual setting of the tone colors for the left-hand and right-hand performances, namely melody and accompaniment perfformances, one by one, the electronic musical instrument according to the preferred embodiment can completely eliminate the need for such cumbersome setting operations.

Next, a description will be made about a second example of behavior of the setting control apparatus in the electronic musical instrument, with reference to FIGS. 6 and 7. According to the second example of behavior, once the predetermined key on the keyboard 2E is depressed while the piano style switch is turned on, one of the piano style data sets corresponding to the depressed key is selected. Then, once the piano style switch is turned off, performance data pertaining to the chord track in the selected piano style data set is placed in a readout standby state. Further, once the human player or user depresses a predetermined key on the keyboard 2E while the demonstration setting switch is turned ON, the style data set corresponding to the depressed key is selected, and then a demonstration performance of a music piece based on the performance data of all the tracks in the selected style data set is initiated when the demonstration setting switch is turned off.

Figure 6:
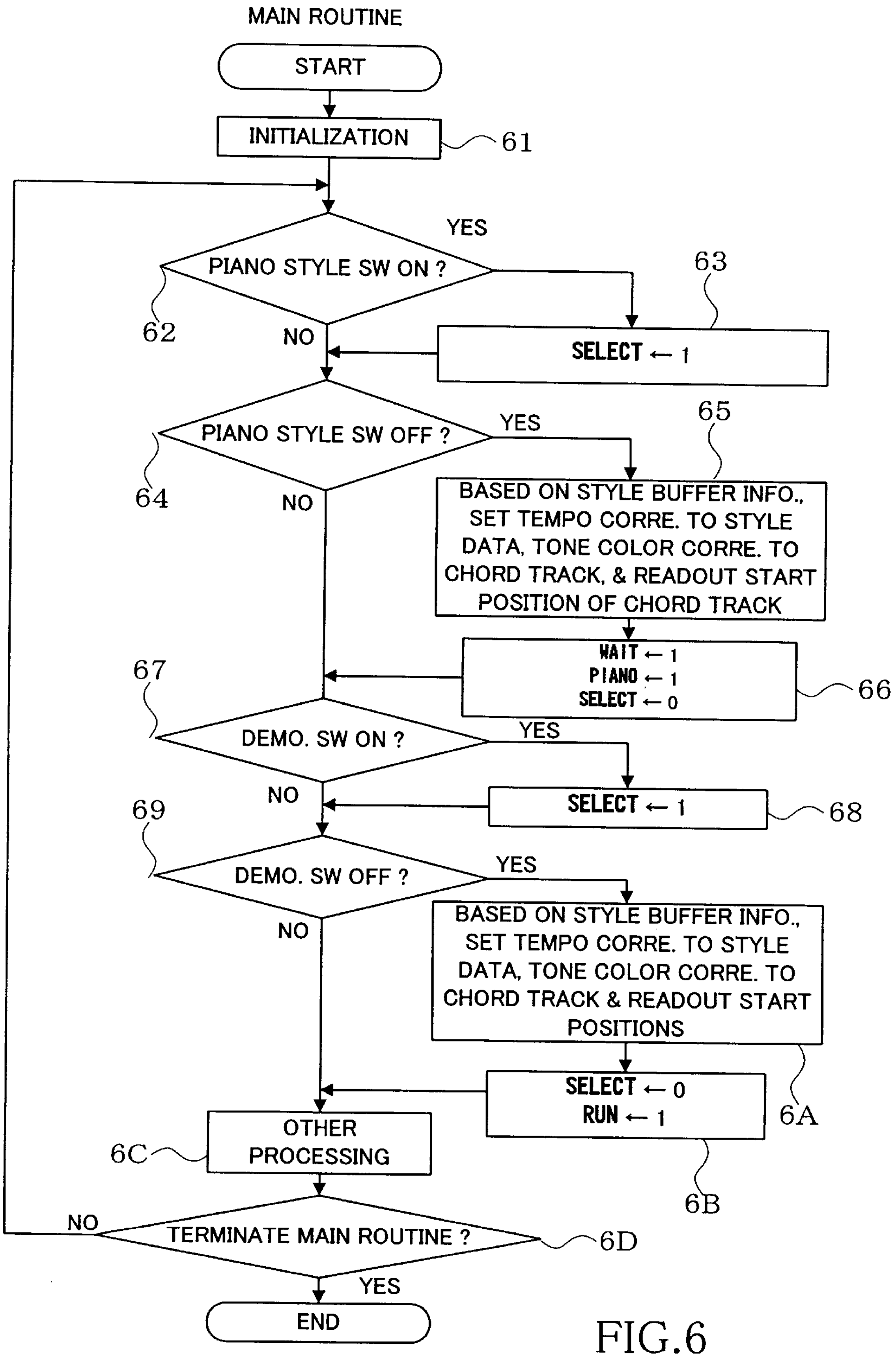
FIG. 6 is a flow chart of a main routine according to a second example of behavior of the setting control apparatus in the electronic musical instrument of the present invention.
Figure 7:
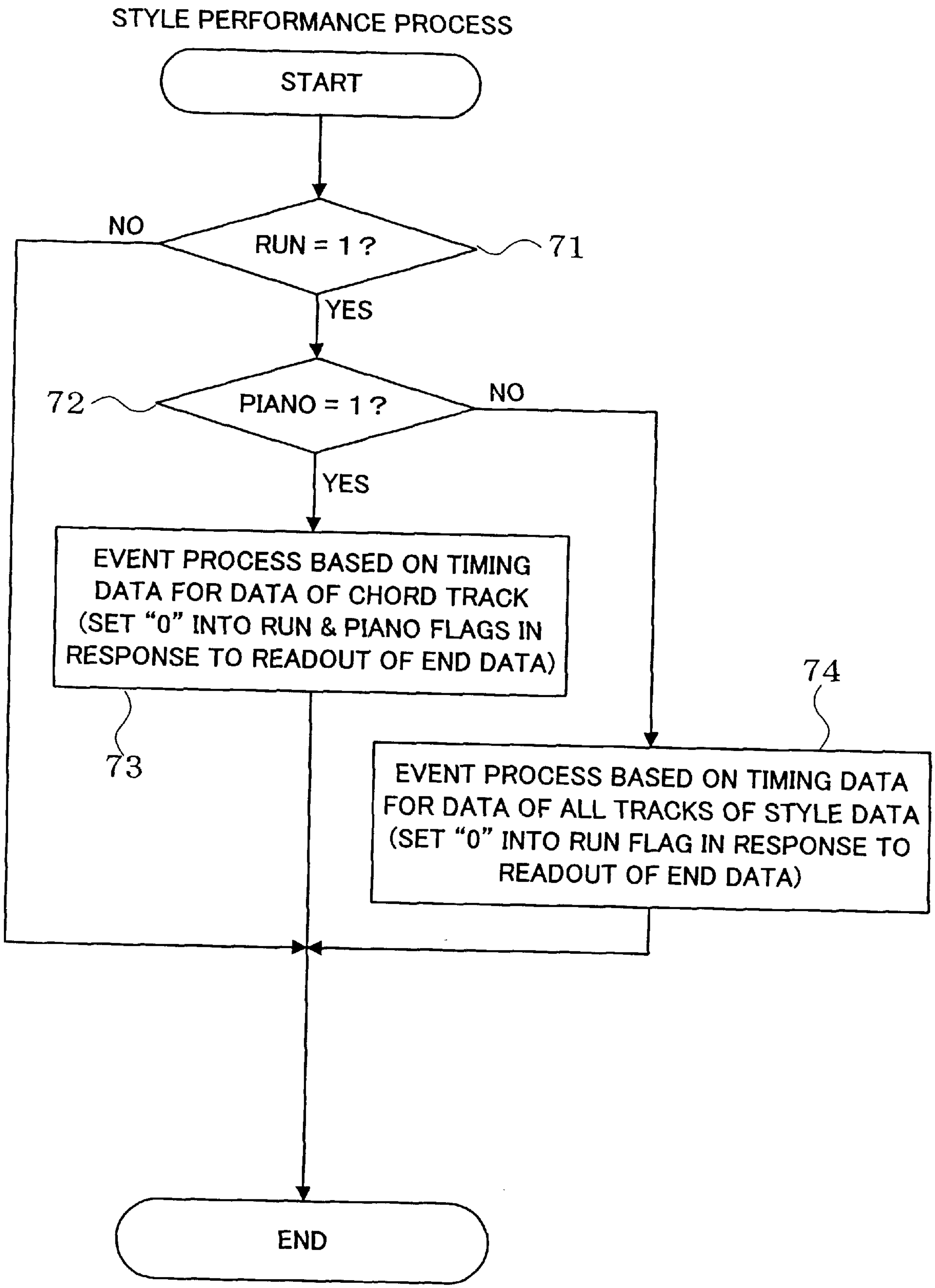
FIG. 7 is a flow chart of a style performance process according to the second example of behavior.

FIG. 6 is a flow chart of a main routine carried out in connection with the second example of behavior of the setting control apparatus in the electronic musical instrument. This main routine proceeds in the following step sequence. At first step 61, an initialization process is performed in a similar manner to the example of FIG. 1, where a value "0" is set into each of the selection flag SELECT, wait flag WAIT and run flag RUN, and a value "1" is set into the style buffer STYLE, as initial values. Piano style flag PIANO is added for the second example of behavior. The piano style flag PIANO at the value "1" indicates that the current performance is a piano style performance playing the chord track alone, while the piano style flag PIANO at the value "1" indicates that the current performance is a demonstration performance playing all the tracks of the style data.

After the initialization process of step 61, the main routine, similarly to the first example of behavior, goes to step 62 to determine whether or not the piano style switch has been activated on the operator section 26 and then to step 64 determine whether or not the piano style switch has been turned off, to carry out operations corresponding to results of the determinations of steps 62 and 64. Specifically, if the piano style switch has been turned on as determined at step 62, the value "1" is set at step 63 into the selection flag SELECT. If the piano style switch has been turned off as determined at step 64, then the main routine proceeds to step 65 in order to set a tempo and tone color in accordance with the piano style data based on information that is currently contained in the style buffer STYLE and also set a performance-data readout start position at leading or first data of the chord track. Then, at step 66, the value "1" is set into the wait and piano style flags WAIT and PIANO, and the value "0" is set into the selection flag SELECT. According to this example, initial settings are made only for reproduction of the chord track, in order to execute an automatic performance only for the performance data of the chord track within the style data corresponding to the style number currently set in the style buffer STYLE. Keyboard performance is sounded with the tone color set in the chord track.

The plural-track piano style data sets shown in FIG. 3B are used in the second example of behavior. Each of the plural-track piano style data sets of FIG. 3B contains, in its header portion, a style number (style 1–style 3), data pertaining to a tempo common to the tracks and data pertaining to tone colors of the tracks. Each of the plural-track piano style data sets also contains, in the header portion, performance data comprising combinations of timing data and event data. Specifically, each of the piano style data sets is composed of performance data of the plural tracks, e.g., melody track as the first track, chord (left-hand performance) track as the second track, rhythm track as the third track and bass track as the fourth track. In this example of behavior, similarly to the first example, a plurality of (three in the illustrated example) sets of the piano style data are prestored in the program memory (ROM) 22. These sets of the piano style data are allocated to or associated with predetermined keys of the keyboard, so that by depressing any one of the predetermined keys while the piano style switch is turned on, one of the sets of the piano style data which corresponds to the depressed predetermined key is read out and set in the electronic musical instrument. Similarly to the first example, a correspondency between the piano style data sets and the keys to be depressed for selection of the style data sets is prestored in the key allocation table, so that one of the piano style data sets can be read out by reference to the key allocation table. According to the second example of behavior, only the chord track among the plural tracks of the selected piano style data set is placed in the readout standby state in response to turning-off of the piano style switch. Further, the electronic musical instrument is placed in a piano style performance state by setting the value "1" into the piano style flag PIANO as will be described later. In addition, the piano style performance is caused to start in synchronism with a start of a user's keyboard performance.

After completion of the operation corresponding to the turning-on or turning-off of the piano style switch, an operation is carried out which corresponds to turning-on or turning-off of the demonstration performance switch. Namely, it is determined at step 67 whether or not the demonstration performance switch has been turned on or activated on the operator section 26, or it is determined at step 69 whether or not the demonstration performance switch has been turned off. If the demonstration performance switch has been turned on as determined at step 67, "1" is set at step 68 into the selection flag SELECT. If the demonstration performance switch has been turned off as determined at step 69, the process goes to step 6A in order to set a tempo corresponding to the style data based on the stored content of the style buffer STYLE and a tone color corresponding to the chord track and also set performance-data readout start positions for all the tracks of the style data performance data. Then, at step 6B, the value "0" is set into the selection flag SELECT and the value "1" is set into the run flag RUN. According to the second example of behavior, when the demonstration performance switch is turned on, initial setting is made for reproduction of all the tracks in the style data set of the style number currently set in the style buffer STYLE, in order to carry out an automatic performance of the style data set. In this case, the keyboard performance is sounded with the tone color set for the chord track of the selected style data set. Further, by setting "1" into the run flag RUN, tone generation is immediately initiated, in a style performance process, on the basis of the style data set selected following the user operation of the demonstration switch. After this, the settings of the style data set will be maintained unless a change is made to the settings of the style data set or the like.

After completion of the operation corresponding to the turning-on or turning-off of the demonstration performance switch, the process moves on to step 6C in order to carry out other processing, which is similar to the other processing described earlier in connection with the first example of behavior and will not be described here to avoid unnecessary duplication. After completion of the other processing at step 6C, a determination is made at step 6D as to whether an instruction to terminate the main routine has been given by the user, i.e., whether the main power source has been turned off. If so, the main routine of FIG. 6 is brought to an end, but if the main power source is still ON, the above-described operations are repeated.

Key depression/release process performed in accordance with the second example of behavior is the same as that in the first example of behavior (FIG. 4) and thus will not be described here. According to the second example of behavior, a style performance process as flow-charted in FIG. 7 is interruptively carried out per timer clock pulse. In this style performance process, a determination is first made at step 71 as to whether or not the run flag RUN is at the value "1", and it is further determined at step 72 whether the piano style flag PIANO is at the value "1". If both the run flag RUN and the piano style flag PIANO are at the value "1" as determined at steps 71 and 72, the process moves on to step 73, where an event process, i.e., automatic performance, is carried out for the data of the chord track on the basis of the timing data and event data. In case end data is read out from among the piano style data, the run flag RUN and piano style flag PIANO are both set to the value "0" so as to prevent the style performance process from being carried out further. If the run flag RUN is at the value "1" and the piano style flag PIANO is at the value "0", an event process based on the timing data, i.e., an automatic performance process, is executed at step 74 on the data of all the tracks within the style data. If the end data is read out, the run flag RUN is set to "0" go so as to prevent the style performance process from being carried out further. Namely, the style performance process is not executed as long as the run flag RUN is at the value "0".

According to the second example of behavior where only the chord track is automatically performed, only the chord track among the plural tracks is reproduced in response to the operation of the piano style switch, which thus can advantageously eliminate a need for the user to take the trouble to mute a particular one of the tracks (e.g., the melody part) which the user does not want to sound. Further, whether or not to place the electronic musical instrument in the performance standby state can be automatically set only with a simple operation to thereby relieve the user from a cumbersome setting operation, and thus the user need not bother about switching to the standby state. Furthermore, because all the tracks of the style data can be reproduced as if a model or demonstration music piece, or a kind of tape recorded music piece, were reproduced, it is preferable that they be reproduced without the performance standby state as in the second example of behavior. Furthermore, in most cases, reproduction of the chord track alone is utilized when the user wants to practice performing the melody part, it is preferable that the chord part be reproduced in synchronism with the user's keyboard manipulation as in the second example of behavior.

It should be appreciated that selection of the piano style data and style data sets may be made by any other procedures than the above-described key depression/release operation, such as operation of dedicated selection switches. Further, whereas the preferred embodiment of the present invention has been described above in relation to the case where the tone color in the style data is set as a tone color for the keyboard performance, the tone color selected by the user via the tone color selection switch may be used as the tone color for the keyboard performance. In this case, it is desirable that the style (automatic performance of the left-hand performance part) be also reproduced with the tone color selected by the user via the tone color selection switch; that is, the automatic performance tones are preferably set to the same manually-set tone color as for the manual performance tones.

Further, it is preferable that the piano style data and style data sets contain, in addition to the tone-color-related data and tempo-related data, parameter information pertaining to effects, such as reverberation and chorus, to be imparted to tones suited for a piano performance so that the parameters are read out in response to activation of the piano style switch and settings of the electronic musical instrument are changed into those suited for the piano performance.

Further, the present invention may be arranged to make settings for any other musical instruments than piano. For instance, the present invention may be designed such that selecting a desired style data set (made up of a plurality of tracks for reproduction of performances of a plurality of musical instruments) by a user operation of a direct instrument setting switch (the piano style switch in the above-described embodiment), along with selection of a desired musical instrument (i.e., tone color), can detect a particular track to be automatically performed from among the plurality of tracks and an automatic performance is carried out on the basis of the detected track. In this case, such a particular track to be automatically performed may be detected using a table storing a relationship between the user-set tone color and the track to be detected. Further, in this case, it is preferable that the settings of the entire electronic musical instrument be changed to those corresponding to the user-selected musical instrument. Furthermore, a plurality of sets of parameters and other information, pertaining to the settings of the entire electronic musical instrument for each musical instrument to be approximated thereby (specifically, for each tone color (piano tone color in the described embodiment), may be prestored in the system memory (ROM) 22. Furthermore, a one-touch setting switch may be provided separately from various function switches so that activation of the one-touch setting switch can readily make the settings of the electronic musical instrument for each desired musical instrument the same manner as in the above-described preferred embodiment.

The music piece data may include data of a plurality of channels in a mixed fashion. Further, the music piece data may be in any desired format, such as: the "event plus absolute time" format where the time of occurrence of each performance event is represented by an absolute time within the music piece or measure; the "event plus relative time" format where the time of occurrence of each performance event is represented by a time length measured from the immediately preceding event; the "pitch (rest) plus note length" format where each performance data is represented by a pitch and length of a note or a rest and a length of the rest; or the "solid" format where a memory region is reserved for each minimum resolution of a performance and each performance event is stored in one of the memory regions that corresponds to the time of occurrence of the performance event.

Whereas the preferred embodiment has been described above in relation to setting of a tempo, tone color etc. the present invention may be designed to set effects and other parameters peculiar to the electronic musical instrument, such as a sensibility of the keyboard of the electronic musical instrument, which can not be set by the standard MIDI file may also be prestored in the style data or in corresponding storage regions contained in the style data so that the various parameters can be set on the basis of a selected style data set.

Furthermore, whereas the automatic performance executed by activation of the piano style switch in accordance with the second example of behavior is designed to carry out an automatic performance only for the chord track, one or more other accompaniment tracks than the chord track, such as rhythm and bass performance tracks, may also be automatically performed. What is essential here is only that the automatic performance of a part or track which the user wants to practice is prevented from being audibly reproduced.

Although no performance data of the part (melody part or right-hand performance part) which the user wants to practice is not stored in memory from the beginning according to the first example of behavior, the performance data of the part for the performance practice may of course be prerecorded and sounded in a very small tone volume. In this way, the user can practice a performance while listening to a reproduction of the performance practice part and such a reproduction of the performance practice part can function as an effective guide to the performance practice. The same can be said with the second example of behavior.

The track organization in the performance data may be other than that described above in connection the preferred embodiment of the present invention. What is essential here is only that the performance data of a particular part to be reproduced is searched for and reproduced from among a plurality of parts.

The present invention having been described so far affords the superior benefit that even a beginner is allowed to readily set, through a very simple operation, various performance parameters in a high-performance electronic musical instrument.

What is claimed is:

1. A music performance apparatus comprising:

a manual performance operator;

an instrument style selector that is used to select a desired instrument style;

a memory that stores a plurality of performance data sets;

a performance style selector that is used to select a desired one of the performance data sets; and a processor coupled at least with said instrument style selector, said memory and said performance style selector, said processor adapted to:

make selectable, via said performance style selector, some of the performance data sets which correspond to the instrument style selected via said instrument style selector;

read out, from said memory, one of the performance data sets made selectable by said processor which has been selected via said performance style selector;

execute an automatic performance on the basis of the performance data set read out from said memory; and control a tone based on a manual performance executed via said manual performance operator, with a tonal characteristic corresponding to the instrument style selected via said instrument style selector.

2. A music performance apparatus as claimed in claim 1 wherein said manual performance operator comprises a keyboard including a plurality of keys, and wherein said performance style selector shares predetermined ones of the keys of said keyboard with the manual performance, and the predetermined keys are allowed to function as said performance style selector in response to selection of the instrument style via said instrument style selector.

3. A music performance apparatus as claimed in claim 1 wherein said memory stores the performance data sets and tone setting parameters for a plurality of performance styles in corresponding relation to a plurality of the instrument styles, and a desired one of the performance styles that belong to the instrument style selected via said instrument style selector is made selectable via said performance style selector, and wherein said processor is adapted to read out the performance data set and tone setting parameters from said memory in accordance with the performance style selected via said performance style selector and control, in accordance with the tone setting parameters read out from said memory, the tone based on the manual performance manual performance executed via said manual performance operator in such a manner that the tone based on the manual performance is controlled with the tonal characteristic corresponding to the instrument style selected via said instrument style selector.

4. A music performance apparatus as claimed in claim 1 wherein the performance data set to be selected via said performance style selector includes automatic performance data of a plurality of performance parts, and said processor executes an automatic performance based on the automatic performance data of a predetermined one of the plurality of performance parts.

5. A music performance apparatus as claimed in claim 1 which further comprises a selector that selects a demonstration performance, and wherein in response to selection of the demonstration performance via said selector, said processor reads out, from said memory, the performance data set corresponding to the performance style selected via said performance style selector and executes an automatic performance corresponding to the selected performance style on the basis of the read-out performance data set.

6. A music performance apparatus as claimed in claim 5 wherein the performance data set selected via said performance style selector includes automatic performance data of a plurality of performance parts, and wherein said processor executes an automatic performance based on the automatic performance data of the predetermined one of the plurality of performance parts when the demonstration performance is not selected, but executes an automatic performance based on the automatic performance data of all of the plurality of performance parts when the demonstration performance is selected.

7. A music performance apparatus comprising:

a manual performance operator;

a selecting device that selects a desired performance style from among a plurality of performance styles;

a memory that stores data including tone setting parameters and automatic performance data sets in corresponding relation to the plurality of performance styles, the tone setting parameters including at least manual performance tone setting parameters that are suited for the plurality of performance styles; and a processor coupled at least with said selecting device and said memory, said processor adapted to read out, from said memory, the tone setting parameters corresponding to the performance style selected via said selecting device and control, in accordance with the manual performance tone setting parameters read out from said memory, a tone based on a manual performance executed via said manual performance operator.

8. A music performance apparatus as claimed in claim 7 which further comprises a setting device that sets parameters for controlling the tone based on the manual performance, and wherein said processor is coupled with said setting device, said selecting device and said memory and is adapted to change contents of the tone setting parameters set via said setting device.

9. A music performance apparatus as claimed in claim 7 wherein said processor is adapted to read, from said memory, one of the automatic performance data sets that corresponds to the performance style selected via said selecting device and execute an automatic performance corresponding to the selected performance style on the basis of the read-out automatic performance data set, and wherein a tone based on the manual performance via said manual performance operator is generated after being controlled in accordance with the manual performance tone setting parameters, and a tone based on the automatic performance is generated simultaneously with said tone based on the manual performance.

10. A music performance apparatus as claimed in claim 9 wherein each of the automatic performance data sets includes automatic performance data of a plurality of performance parts that corresponds to a single music piece, and said processor executes an automatic performance based on the automatic performance data of a predetermined one of the plurality of performance parts.

11. A music performance apparatus as claimed in claim 7 wherein said selecting device includes a mode selector that selects a performance style selection mode, and wherein in response to selection of the performance style selection mode via said mode selector, said manual performance operator is allowed to function as a selector for selecting a desired one of the performance styles in such a manner that activation of said manual performance operator can select the desired performance style.

12. A setting apparatus for an electronic music performance apparatus comprising:

a manual setting device that sets parameters for controlling a tone to be generated via said electronic music performance apparatus;

a selecting device that selects a desired instrument style from among a plurality of instrument styles;

a memory that stores at least tone setting parameters in corresponding relation to the plurality of instrument styles, said tone setting parameters including tone setting parameters corresponding to the parameters capable of being set via said manual setting device; and a processor coupled at least with said manual setting device, said selecting device and said memory, said processor adapted to read out, from said memory, the tone setting parameters corresponding to the instrument style selected via said selecting device and change, in accordance with the read-out tone setting parameters, contents of the parameters set via said manual setting device in such a manner that parameter settings in a whole of said electronic music performance apparatus are adjusted to contents corresponding to the selected instrument style.

13. A music performance apparatus comprising:

a setting device that sets parameters for controlling a tone;

a style selecting device that selects a desired performance style from among a plurality of performance styles;

a memory that stores data including tone setting parameters and automatic performance data sets in corresponding relation to the plurality of performance styles, the tone setting parameters including tone setting parameters corresponding to the parameters capable of being set via said setting device;

a mode selector that selects a demonstration performance;

a processor coupled with said setting device, said style selecting device and said memory, said processor adapted to, in response to selection of the demonstration performance via said mode selector, read out, from said memory, the tone setting parameters and the automatic performance data set for all parts corresponding to the performance style selected via said style selecting device, execute an automatic performance for all parts based on the read-out automatic performance data set and control a tone in accordance with the tone setting parameters; and wherein said processor is further adapted to, when the demonstration performance is not selected via said mode selector, read out the tone setting parameters and automatic performance data of a predetermined one or more, but not all, parts that correspond to the performance style selected via said style selecting device, and then carry out an automatic performance of the predetermined one or more of the parts based on the read-out automatic performance data.

14. A method of making settings for manual and automatic performances in response to selection of an instrument style, said method comprising the steps of:

selecting a desired instrument style;

making selectable only some of automatic performance data sets stored in memory which correspond to the instrument style selected via said step of selecting;

selecting a desired one of the automatic performance data sets made selectable via said step of making;

reading out, from said memory, the automatic performance data set selected via said step of selecting and executing an automatic performance on the basis of the read-out automatic performance data; and setting a characteristic of a tone based on a manual performance to a tonal characteristic corresponding to the selected instrument style.

15. A machine-readable storage medium containing a group of instructions of a program executable by a processor for making settings for manual and automatic performances in response to selection of an instrument style, said program comprising the steps of:

selecting a desired instrument style;

making selectable only some of automatic performance data sets stored in memory which correspond to the instrument style selected via said step of selecting;

selecting a desired one of the automatic performance data sets made selectable via said step of making;

reading out, from said memory, the automatic performance data set selected via said step of selecting and executing an automatic performance on the basis of the read-out automatic performance data; and setting a characteristic of a tone based on a manual performance to a tonal characteristic corresponding to the selected instrument style.

16. A parameter setting method for a music performance apparatus including a manual performance operator and a memory storing data including tone setting parameters and automatic performance data sets in corresponding relation to a plurality of performance styles, the tone setting parameters including at least manual performance tone setting parameters that are suited for the plurality of performance styles, said method comprising:

a first step of selecting a desired one of the plurality of performance styles;

a second step of reading out, from said memory, the manual performance tone setting parameters that correspond to the performance style selected via said first step; and a third step of setting parameters for controlling, in accordance with the manual performance tone setting parameters read out from said memory, a tone based on a manual performance executed via said manual performance operator.

17. A machine-readable storage medium containing a group of instructions of a program executable by a processor for setting parameters in a music performance apparatus including a manual performance operator and a memory storing data including tone setting parameters and automatic performance data sets in corresponding relation to a plurality of performance styles, the tone setting parameters including at least manual performance tone setting parameters that are suited for the plurality of performance styles, said method comprising:

a first step of selecting a desired one of the plurality of performance styles;

a second step of reading out, from said memory, the manual performance tone setting parameters that correspond to the performance style selected via said first step; and a third step of setting parameters for controlling, in accordance with the manual performance tone setting parameters read out from said memory, a tone based on a manual performance executed via said manual performance operator.

* * * * *